(12) United States Patent
Ohashi et al.

(10) Patent No.: US 8,362,860 B2
(45) Date of Patent: Jan. 29, 2013

(54) SUPERCONDUCTING APPARATUS (75) Inventors: Yoshimasa Ohashi, Kariya (JP); Nobuo Okumura, Toyota (JP); Hidetoshi Kusumi, Nagoya (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 414 days.

(21) Appl. No.: 12/694,377

(22) Filed: Jan. 27, 2010

(65) Prior Publication Data

US 2011/0025438 A1 Feb. 3, 2011

(30) Foreign Application Priority Data

Jan. 30, 2009 (JP) ................. 2009-018886

(51) Int. Cl.
*H01F 1/00* (2006.01)
*H01F 6/00* (2006.01)
(52) U.S. Cl. ............. 335/216; 335/296; 310/51; 310/54
(58) Field of Classification Search .................. 335/216, 335/296–299; 310/51, 54
See application file for complete search history.

(56) References Cited

U.S. PATENT DOCUMENTS

| | | | |
|---|---|---|---|
| 3,242,418 A | 3/1966 | Mela et al. | |
| 4,398,108 A | 8/1983 | Danilevich et al. | |
| 7,821,169 B2 * | 10/2010 | Okazaki et al. | 310/156.36 |
| 2002/0074882 A1 * | 6/2002 | Werfel et al. | 310/90.5 |
| 2004/0256922 A1 * | 12/2004 | Steinmeyer | 310/52 |
| 2005/0156470 A1 * | 7/2005 | Gromoll et al. | 310/52 |
| 2010/0038986 A1 * | 2/2010 | Hull et al. | 310/165 |
| 2010/0148593 A1 * | 6/2010 | Ohashi et al. | 310/10 |
| 2010/0283564 A1 * | 11/2010 | Takeda et al. | 335/216 |

FOREIGN PATENT DOCUMENTS

| | | |
|---|---|---|
| JP | 55-131252 A | 10/1980 |
| JP | H02-133187 | 11/1990 |
| JP | 10-285906 A | 10/1998 |
| JP | 2003-009454 | 1/2003 |
| JP | 2003-009454 A | 10/2003 |
| JP | 2006-122785 A | 5/2006 |
| JP | 2006-136071 A | 5/2006 |
| JP | 2006-238570 A | 9/2006 |
| JP | 2007-89345 A | 4/2007 |

OTHER PUBLICATIONS

Official Action dated Dec. 9, 2010, issued by the Japanese Patent Office in corresponding Japanese patent application No. 2009-018886, and English translation of Official Action.
Office Action issued by the Japan Patent Office on Nov. 8, 2012 in corresponding Japanese Patent Application Publication No. 2011-023589, and English translation thereof.
Official Action issued by the Japan Patent Office on Nov. 8, 2012 in corresponding Japanese Patent Application Publication No. 2011-023589, and English translation thereof.

* cited by examiner

*Primary Examiner* — Bernard Rojas
(74) *Attorney, Agent, or Firm* — Buchanan Ingersoll & Rooney PC (57) ABSTRACT

A superconducting apparatus includes a superconducting member generating a magnetic field when an electric power is supplied to the superconducting member, a permeable yoke into which a magnetic flux of the magnetic field generated by the superconducting member permeates, and a conductive portion cooled to a low temperature state by a low temperature portion and cools the permeable yoke by thermally making contact therewith.

9 Claims, 6 Drawing Sheets

SUPERCONDUCTING APPARATUS

CROSS REFERENCE TO RELATED APPLICATIONS

This application is based on and claims priority under 35 U.S.C. §119 to Japanese Patent Application 2009-018886, filed on Jan. 30, 2009, the entire content of which is incorporated herein by reference.

TECHNICAL FIELD

This disclosure relates to a superconducting apparatus.

BACKGROUND DISCUSSION

A known superconducting motor apparatus serving as a superconducting apparatus is disclosed in JP2007-89345A (which will be hereinafter referred to as Reference 1). The superconducting motor apparatus disclosed in Reference 1 includes a superconducting coil generating a magnetic field when an electric power is supplied to the superconducting coil and a vacuum container defining a vacuum heat insulation chamber that accommodates the superconducting coil. The superconducting motor apparatus further includes a permeable yoke into which a magnetic flux of the magnetic field generated by the superconducting coil penetrates.

According to the superconducting motor apparatus disclosed in Reference 1, a heat penetration into the superconducting coil may suddenly occur depending on a practical use condition. In such case, the superconducting coil may be partially heated thereby deteriorating an output of the superconducting motor apparatus.

A need thus exists for a superconducting apparatus which is not susceptible to the drawback mentioned above.

SUMMARY

According to an aspect of this disclosure, a superconducting apparatus includes a superconducting member generating a magnetic field when an electric power is supplied to the superconducting member, a permeable yoke into which a magnetic flux of the magnetic field generated by the superconducting member permeates, and a conductive portion cooled to a low temperature state by a low temperature portion and cools the permeable yoke by thermally making contact therewith.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment disclosed here will be explained with reference to FIGS. 1 and 2. The embodiment applies to a superconducting motor apparatus, which is an example of a magnetic field generator serving as a representative example of a superconducting apparatus. A superconducting motor apparatus 1 may be used in a vehicle, in a stationary state, for an industrial purpose, and the like. The superconducting motor apparatus 1 includes a superconducting motor 2 serving as a magnetic field generating portion, an extremely low temperature generating portion 3 serving as a low temperature portion, a container 4, and electric current lead-in terminals 5 (hereinafter simply referred to as lead-in terminals 5).

The superconducting motor 2 serves as a motor to which a three-phase alternating current is supplied. The three phases are different from one another by 120 degrees each. The superconducting motor 2 includes a stator 20 having a cylindrical shape about an axial center P1 of the superconducting motor 2 and a rotor 27 serving as a mover rotatable relative to the stator 20. The rotor 27 includes a rotational shaft 28 rotatably supported about the axial center P1 of the superconducting motor 2 and multiple permanent magnet portions 29 arranged at equal intervals at an outer peripheral portion of the rotational shaft 28. The permanent magnet portions 29 are formed by known permanent magnets.

The stator 20 includes a stator core 21 and a superconducting coil 22. The stator core 21, which serves as a magnetically permeable yoke (permeable yoke), is formed into a cylindrical shape by a material having a high magnetic permeability. The superconducting coil 22, which serves as a superconducting member, is wound on teeth portions 210 constituting the stator core 21 and held thereat. The multiple teeth portions 210 are arranged in a circumferential direction of the stator 20 while having equal distances so as to project in a radially inner direction of the stator core 21. In FIG. 1, a coil wire 22$x$ and a coil wire 22$y$ of the superconducting coil 22 sandwiching each of the teeth portions 210 supply electric currents respectively in opposite directions from each other.

A radially inner end of each of the teeth portions 210 makes contact with the third container 45. Alternatively the radially inner end of each of the teeth portions 210 may be prevented from making contact with a third container 45. The superconducting coil 22 is divided into three portions so that the three-phase alternating current can be supplied. The superconducting coil 22 is formed by a known superconducting material. The superconducting coil 22 is arranged within throttle grooves 21$a$ formed at an inner peripheral portion of the stator core 21. In a case where the three-phase alternating current is supplied to the superconducting coil 22, a rotational magnetic field is generated, rotating around the stator 20, i.e., the axial center P1 of the stator 20. The rotor 27 rotates about the axial center P1 by means of the rotational magnetic field, thereby obtaining a motor function.

The extremely low temperature generating portion 3 maintains the superconducting coil 22 at an extremely low temperature so as to retain a superconducting state of the superconducting coil 22. An extremely low temperature range obtained by the extremely low temperature generating portion 3 is selected depending on the superconducting material that constitutes the superconducting coil 22. The temperature range may be equal to or smaller than a helium liquefaction temperature or equal to or smaller than a nitrogen liquefaction temperature. For example, the temperature range is equal to 0 to 150K, specifically, 1 to 100K or 1 to 80K. At this time, however, the temperature range is not limited to such values and is dependent on the superconducting material forming the superconducting coil 22. The extremely low temperature generating portion 3 includes a refrigerator 30 having a cold head 32 where the extremely low temperature is generated. A known refrigerator such as a pulse tube refrigerator, a Stirling refrigerator, a Gifford-McMahon refrigerator, a Solvay refrigerator, and a Vuilleumier refrigerator is used as the refrigerator 30.

A conductive portion 33 connects the cold head 32 of the refrigerator 30 and the stator core 21 of the stator 20 of the superconducting motor 2 to each other so that a temperature transfer is possible between the cold head 32 and the stator core 21. The conductive portion 33 includes a head portion 33h that is cooled to a low temperature by the cold head 32. The conductive portion 33 is made of a material having a thermal conductivity (temperature conductivity) such as copper, copper alloy, aluminum, and aluminum alloy.

Figure 1:
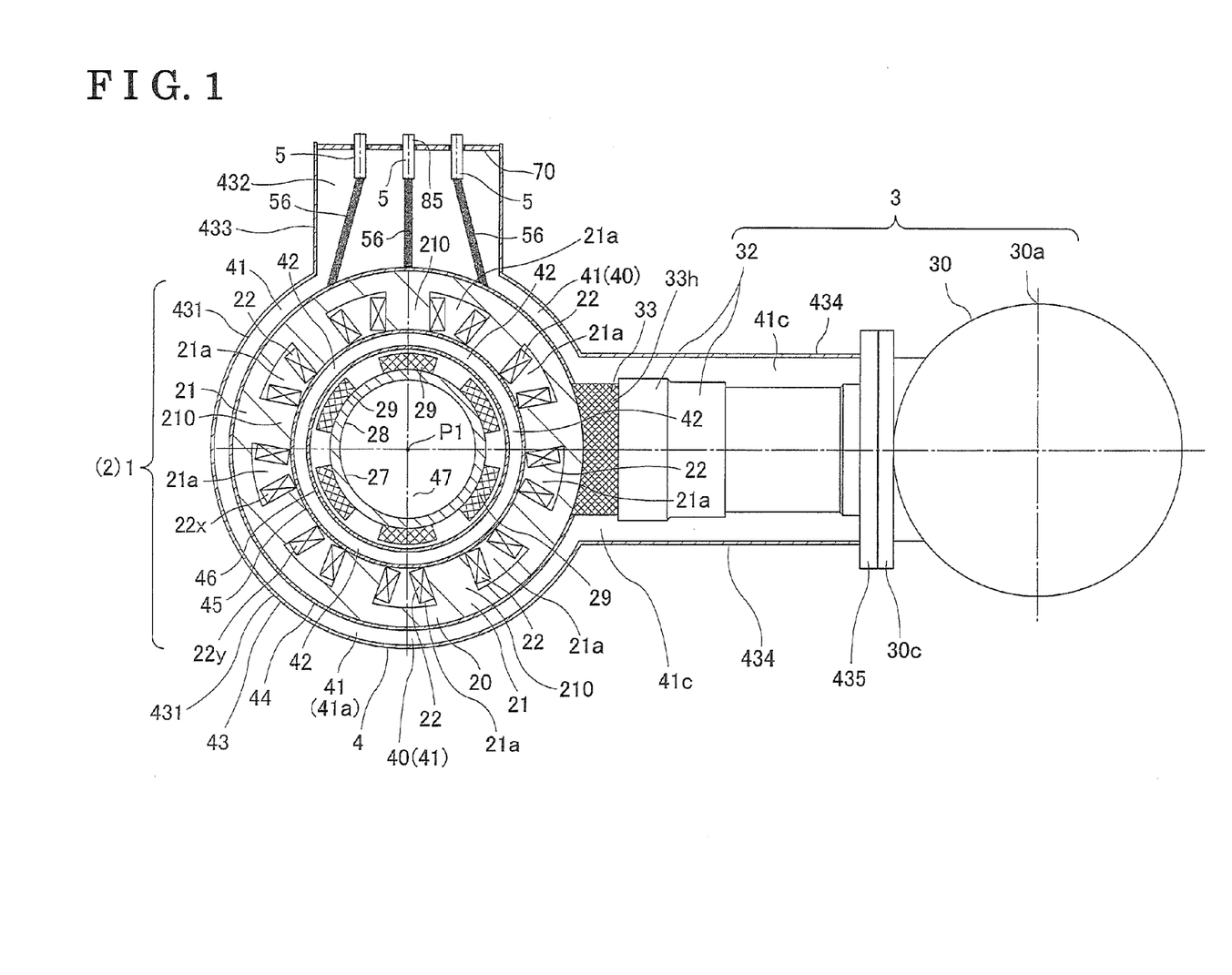
FIG. 1 is a cross-sectional view of a superconducting motor apparatus according to a first embodiment disclosed here.

As illustrated in FIG. 1, the container 4 includes a vacuum heat insulation chamber 40 serving as a decompressed heat insulation chamber for heat-insulating the superconducting coil 22. At this time, the term "vacuum" corresponds to a decompressed state in which a sufficient heat insulation is maintained, i.e., a state equal to or smaller than $10^{-1}$ Pa. The vacuum heat insulation chamber 40 of the container 4 includes an outer vacuum heat insulation chamber 41 and an inner vacuum heat insulation chamber 42. The outer vacuum heat insulation chamber 41 covers an outer peripheral side (outer side) of the superconducting coil 22 wound on the stator 20 and held thereby and an outer peripheral side (outer side) of the stator 20. For example, the pressure in the outer vacuum heat insulation chamber 41 is equal to or smaller than $10^{-1}$ Pa, or equal to or smaller than $10^{-2}$ Pa. The inner vacuum heat insulation chamber 42 covers an inner peripheral side (inner side) of the superconducting coil 22 and an inner peripheral side (inner side) of the stator 20. For example, the pressure in the inner vacuum heat insulation chamber 42 is equal to or smaller than $10^{-1}$ Pa, or equal to or smaller than $10^{-2}$ Pa. The vacuum heat insulation chamber 40 is maintained in a high vacuum state (i.e., in a state to be decompressed relative to an atmospheric pressure) upon shipment. The vacuum heat insulation chamber 40 is desirably maintained in the high vacuum state over a long period of time.

Because the superconducting coil 22 is covered by both the outer vacuum heat insulation chamber 41 and the inner vacuum heat insulation chamber 42, the superconducting coil 22 is maintained in an extremely low temperature state, and further in a superconducting state. As illustrated in FIG. 1, the outer vacuum heat insulation chamber 41 includes a first insulation chamber portion 41a covering an outer peripheral portion of the stator 20 and a second insulation chamber portion 41c covering outer peripheral portions of the head portion 33h of the conductive portion 33 and the cold head 32. The second insulation chamber portion 41c surrounds the conductive portion 33 and the cold head 32, thereby maintaining the conductive portion 33 and the cold head 32 at a low temperature. As illustrated in FIG. 1, the container 4 includes a first container 43, a second container 44, the third container 45, and a fourth container 46 in order from a radially outer side to a radially inner side. The first to fourth containers 43 to 46 are coaxially arranged with one another. The first container 43 and the second container 44 face each other in a radial direction of the stator core 21 so as to define the outer vacuum heat insulation chamber 41. The third container 45 and the fourth container 46 face each other in the radial direction of the stator core 21 so as to define the inner vacuum heat insulation chamber 42.

The rotor 27 is rotatably arranged in a void 47 having a cylindrical shape defined by the fourth container 46. The void 47 is connected to an outer atmosphere. The rotor 27 is connected to a rotating operation member, which is a wheel, for example, in a case where the superconducting motor apparatus 1 is mounted on a vehicle such as an automobile. In such case, when the rotor 27 rotates, the wheel rotates accordingly.

As illustrated in FIG. 1, the first container 43 includes a first cover portion 431, a guide portion 433, a second cover portion 434, and an attachment flange portion 435. The first cover portion 431 having a cylindrical shape covers an outer peripheral portion of the superconducting motor 2. The guide portion 433 defines a guide chamber 432 for guiding three-phase electric current lead-in wires 56 (which will be hereinafter referred to as lead-in wires 56) that supply an electric power to the superconducting coil 22. The second cover portion 434 covers the cold head 32 and the conductive portion 33. A flange 30c of a compression mechanism 30a that compresses a refrigerant gas in the refrigerator 30 is mounted on the attachment flange portion 435. The guide portion 433 is formed, projecting from the first cover portion 431 that covers the superconducting motor 2. An outer side of the first container 43 may be exposed to the outer atmosphere but is not limited thereto. The outer side of the first container 43 may be covered by a heat insulation material.

The first container 43 is made of a material desirably having a strength and through which leakage flux does not penetrate or is difficult to penetrate. A nonmagnetic metal having a low permeability such as an alloy steel, i.e., an austenitic stainless steel, is used for the material of the first container 43, for example. Each of the second, third, and fourth containers 44, 45, and 46 is made of a material desirably having a high electric resistance so as to restrain eddy current that may be generated on the basis of change in magnetic flux. A nonmetallic material such as resin, reinforced resin for a reinforcing material, and ceramic is used for the material forming the second to fourth containers 44, 45 and 46, for example. The reinforcing material is a mineral material such as glass and ceramic, for example. The reinforcing material is desirably a reinforced fiber and is an inorganic fiber such as a glass fiber and a ceramic fiber. The resin may be either a thermosetting resin or a thermoplastic resin.

As illustrated in FIG. 1, a fixed board 70 serving as a holding portion is fixed to an upper end of the guide portion 433 that has a cylindrical shape formed at a portion of the first container 43 in a projecting manner. The fixed board 70 is made of a material having an electrically and thermally high insulation and/or is difficulty in permeation of magnetic flux. For example, a nonmetallic material such as fiber-reinforced resin, resin, and ceramic may be used for the material forming the fixed board 70. A nonmagnetic metallic material having a low permeability may be used for the material as the need may be. In such case, an electric insulation structure is desirably applied to each of the lead-in terminals 5. The guide chamber 432 is connected to the outer vacuum heat insulation chamber 41. Thus, in a case where the superconducting motor 2 is driven, the guide chamber 432 is in the vacuum insulation state (i.e., decompressed heat insulation state). The guide chamber 432 exercises the heat insulation function to thereby maintain the lead-in terminals 5 at the low temperature.

As illustrated in FIG. 1, the multiple (three) lead-in terminals 5 are electrically connected to the superconducting coil 22 via the respective lead-in wires 56. The lead-in terminals 5 include a conductive material as a base material through which an electric power is supplied to the superconducting coil 22. The lead-in terminals 5, which include projecting portions 85, respectively, are fixedly arranged at the fixed board 70 provided at the end of the guide portion 433 of the first container 43.

A structure for fixing the lead-in terminals 5 to the fixed board 70 is not specifically determined. According to the present embodiment, the lead-in terminals 5 are substantially coaxially inserted into respective through-holes formed at the fixed board 70. A seal member is disposed between an inner wall surface of each of the first through-holes and an outer wall surface of each of the lead-in terminals 5 so as to increase air tightness therebetween. Accordingly, the guide chamber 432 is sealed relative to the outer atmosphere outside of the container 4. The high vacuum state (decompressed state) of the guide chamber 432 is maintained. As illustrated in FIG. 1, first ends of the lead-in terminals 5 are accommodated within the guide chamber 432 while second ends (i.e., the projecting portions 85) of the lead-in terminals 5 are positioned so as to protrude out of the guide chamber 432. A material forming the lead-in terminals 5 is not specifically defined as long as the material is electrically conductive. For example, copper, copper alloy, aluminum, aluminum alloy, iron, iron alloy, silver, or silver alloy may be used for the material forming the lead-in terminals 5.

When a change-over switch is turned on for a driving of the superconducting motor 2, the three-phase alternating current is supplied from an external electric power source to the lead-in terminals 5 and further to the superconducting coil 22. Then, the rotational magnetic field is generated around the axial center P1 of the superconducting motor 2 to thereby rotate the rotor 27 about the axial center P1. The superconducting motor 2 is driven accordingly. The magnetic flux penetrates through the third container 45, the inner vacuum heat insulation chamber 42, and the fourth container 46, thereby generating an attraction force and a repelling force at the permanent magnet portions 29 of the rotor 27. The rotor 27 rotates about the axial center P1 accordingly.

When the superconducting motor 2 is driven, the superconducting coil 22 and the stator core 21 are appropriately maintained at the extremely low temperature that is generated by the extremely low temperature generating portion 3. Thus, the superconducting coil 22 is maintained at a temperature equal to or smaller than a critical temperature, which leads to an appropriate rotational driving of the superconducting motor 2. Because the electric resistance of the superconducting coil 22 is equal to zero or is extremely low, the output of the superconducting motor 2 is high. According to the present embodiment, the void 47 defined by an inner peripheral surface of the fourth container 46 is connected to the outer atmosphere. Thus, the fourth container 46 is arranged in a higher temperature than the third container 45.

Figure 2:
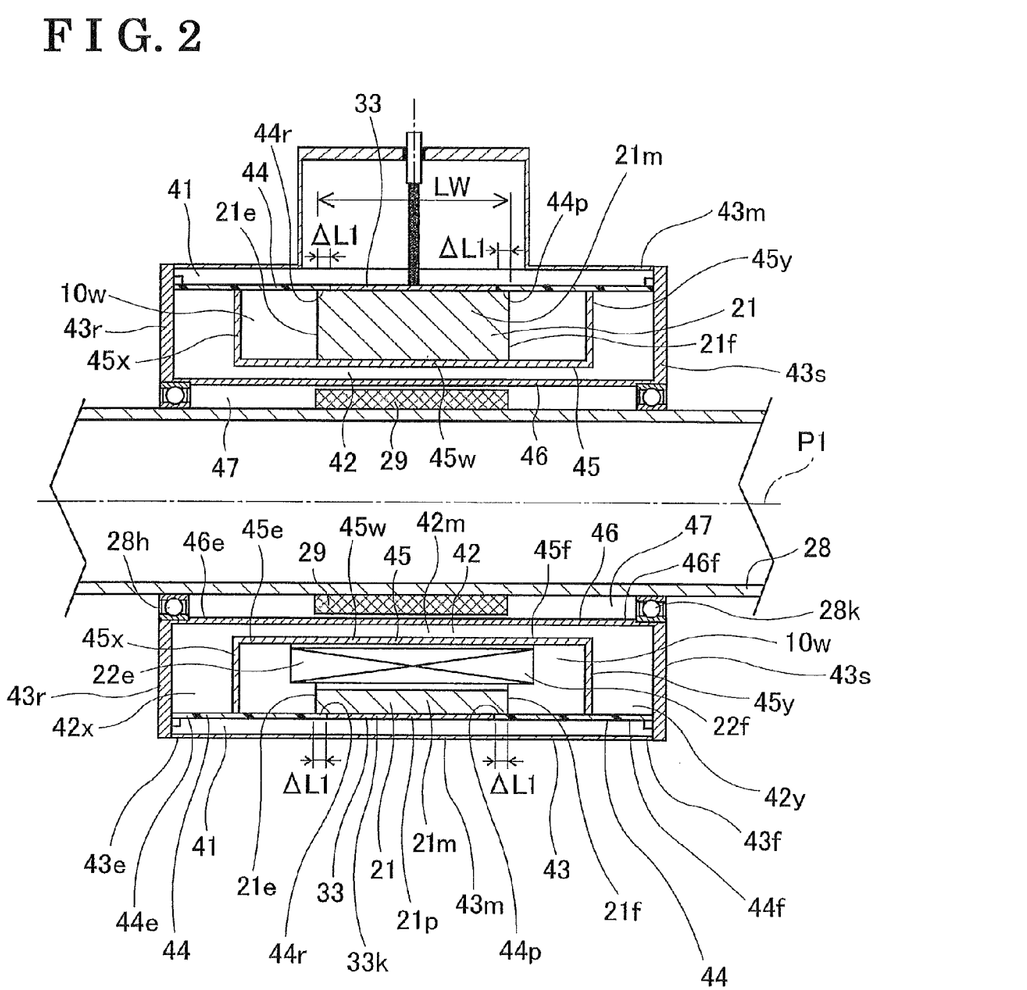
FIG. 2 is a cross-sectional view taken along an axial center of the superconducting motor apparatus according to the first embodiment.

As illustrated in FIG. 2, the first container 43 serving as a housing of the superconducting motor apparatus 1 includes a cylinder portion 43m, a first cover portion 43r, and a second cover portion 43s. The cylinder portion 43m is formed, extending to be coaxial with the axial center P1 of the superconducting motor 2. The first cover portion 43r having a high rigidity supports one axial end (first end) 43e of the cylinder portion 43m. The second cover portion 43s having a high rigidity supports the other axial end (second end) 43f of the cylinder portion 43m.

The first cover portion 43r supports one axial end (first end) 46e of the fourth container 46. The second cover portion 43s supports the other axial end (second end) 46f of the fourth container 46. A first bearing 28h is disposed between the first cover portion 43r and the rotational shaft 28. In addition, a second bearing 28k is disposed between the second cover portion 43s and the rotational shaft 28. The rotational shaft 28 is rotatable about the axial center P1 by means of the first and second bearings 28h and 28k.

As illustrated in FIG. 2, the conductive portion 33 includes a cooling cylinder portion 33k having a cylindrical shape about the axial center P1. The cooling cylinder portion 33k is connected to the head portion 33h (see FIG. 1). In addition, the cooling cylinder portion 33k is provided at an outer peripheral portion 21p of the stator core 21 so as to be coaxial therewith while thermally making contact with the outer peripheral portion 21p and covering the outer peripheral portion 21p. At this time, in a state where an axial length of the stator core 21 is defined to be LW, the cooling cylinder portion 33k of the conductive portion 33 covers an axially intermediate portion of the stator core 21 in the axial length LW i.e., an intermediate portion 21m of the stator core 21 in an axial direction thereof, while thermally making contact with the intermediate portion 21m. Accordingly, when the cooling cylinder portion 33k of the conductive portion 33 is cooled to the extremely low temperature state, the outer peripheral portion 21p of the stator core 21 is cooled, thereby cooling the entire stator core 21. The intermediate portion 21m corresponds to a portion of the stator core 21 in the axial direction where a first end 21e and a second end 21f are excluded.

One axial end (first end) 44e of the second container 44 is supported by the first cover portion 43r while the other axial end (second end) 44f of the second container 44 is supported by the second cover portion 43s. Thus, the second container 44 is supported by the first container 43 (base member) by means of a high support strength. A first facing portion 44r of the second container 44 faces and makes contact with the first end 21e of the stator core 21. A second facing portion 44p of the second container 44 faces and makes contact with the second end 21f of the stator core 21. As a result, the first facing portion 44r supports the first end 21e of the stator core 21, and the second facing portion 44p supports the second end 21f of the stator core 21. The first and second facing portions 44r and 44p are each arranged in a ring shape around the axial center P1.

A length of each of the facing portions 44r and 44p of the second container 44 is indicated by $\Delta L1$ in FIG. 2. Even in a case where a reaction force of the superconducting motor 2 (i.e., a motor reaction force) acts on the stator core 21 at a time of rotational driving of the superconducting motor 2, the facing portions 44r and 44p of the second container 44 can support the outer peripheral portion 21p of the stator core 20. Further, because the facing portions 44r and 44p face both axial ends of the stator core 21, the supporting properties of the facing portions 44r and 44p relative to the stator core 21 are greatly enhanced. Accordingly, the facing portions 44r and 44p of the second container 44 function as opposing members against the motor reaction force.

The second container 44 is made of, for example, a non-metallic material serving as a base material such as resin, reinforced resin for a reinforcing material, and ceramic. Thus, a thermal conductivity (temperature conductivity) of the second container 44 is lower than that of the conductive portion 33 of which a base material is metal such as copper, aluminum, copper alloy, and aluminum alloy. Thus, the heat intrusion from the first and second cover portions 43r and 43s of the first container 43 through the second container 44 to the stator core 21 is restrained as much as possible.

As illustrated in FIG. 2, the outer vacuum heat insulation chamber 41 is formed between the cooling cylinder portion 33k of the conductive portion 33 (or the second container 44) and the first container 43. The heat intrusion from the first container 43 to the cooling cylinder portion 33k of the conductive portion 33 (or the second container 44) is restrained accordingly. Further, the heat intrusion to the stator core 21 and the superconducting coil 22 via the cooling cylinder portion 33k of the conductive portion 33 is restrained.

According to the present embodiment, the third container 45 includes a cylinder portion 45w, a first flange 45x and a second flange 45y. The cylinder portion 45w extends along the axial center P1. The first flange 45x is formed at one axial end (i.e., a first end) 45e of the cylinder portion 45w so as to extend radially outwardly while the second flange 45y is formed at the other axial end (i.e., a second end) 45f of the cylinder portion 45w so as to extend radially outwardly. Outer peripheral portions of the first flange 45x and the second flange 45y are supported by the second container 44 so as to face the second container 44.

The second container 44 and the third container 45 define a heat insulation chamber 10w. The heat insulation chamber 10w accommodates the stator core 21 and the superconducting coil 22.

As illustrated in FIG. 2, the inner vacuum heat insulation chamber 42 includes an intermediate chamber 42m, a first end chamber 42x, and a second end chamber 42y. The intermediate chamber 42m is formed into a cylindrical shape. The first end chamber 42x having a ring shape is connected to one axial end of the intermediate chamber 42m. The second end chamber 42y having a ring shape is connected to the other axial end of the intermediate chamber 42m. The first end chamber 42x surrounds the first end 21e of the stator core 21 and a first end 22e of the superconducting coil 22 via the heat insulation chamber 10w for vacuum heat insulation. The second end chamber 42y surrounds the second end 21f of the stator core 21 and a second end 22f of the superconducting coil 22 via the heat insulation chamber 10w for vacuum heat insulation. The extremely low temperature state of each of the stator core 21 and the superconducting coil 22 is further enhanced accordingly.

According to the present embodiment, the stator core 21 serving as a magnetically permeable yoke (permeable yoke) is positioned adjacent to the superconducting coil 22 so that the magnetic flux of the magnetic field generated by the superconducting coil 22 is permeated through the stator core 21. The cooling cylinder portion 33k of the conductive portion 33 is cooled to the extremely low temperature state by means of the cold head 32 of the extremely low temperature generating portion 3. The cooling cylinder portion 33k of the conductive portion 33 that is cooled to the extremely low temperature state thermally makes contact with the outer peripheral portion 21p of the stator core 21 to thereby cool the stator core 21. When the stator core 21 is cooled in the aforementioned manner, the temperature of the superconducting coil 22 positioned adjacent to the stator core 21 is maintained in the low temperature state. Thus, even when the heat intrusion occurs at the superconducting coil 22 or an output of the refrigerator 30 is insufficient because of a disturbance, a rapid increase of a motor load, and the like, the stator core 21 having a great cooling capacity maintains the superconducting coil 22 in the low temperature state. The temperature increase of the superconducting coil 22 is restrained to thereby retain the superconducting state of the superconducting coil 22.

Specifically, the cooling cylinder portion 33k of the conductive portion 33 thermally makes contact with the outer peripheral portion 21p, having a large radius, of the stator core 21. Thus, a contact area between the cooling cylinder portion 33k of the conductive portion 33 and the outer peripheral portion 21p of the stator core 21 is large, which contributes to cooling of the stator core 21. A volume of the stator core 21 is larger than that of the superconducting coil 22 and a cooling storage volume of the stator core 21 is large.

According to the present embodiment, instead of directly cooling the superconducting coil 22, the stator core 21 positioned adjacent to the superconducting coil 22 and having a large thermal capacity is actively cooled by the conductive portion 33. Thus, even when the superconducting coil 22 is partially heated, the superconducting coil 22 is immediately cooled by the cold temperature of the stator core 21.

Further, a material constituting the conductive portion 33 such as copper, aluminum, copper alloy, and aluminum alloy has a greater linear expansion coefficient (which corresponds to a thermal shrinkage ratio) than that of a material constituting the stator core 21 such as an iron-based material. In this case, in a state where the cooling cylinder portion 33k of the conductive portion 33 surrounds or covers the stator core 21 in a coaxial manner, an amount of thermal shrinkage of the cooling cylinder portion 33k of the conductive portion 33 is ensured in a radial direction.

An assembly of the superconducting motor apparatus 1 is performed not in the extremely low temperature state but in a higher temperature range than the extremely low temperature state, for, example, in a normal temperature range. On the other hand, when the superconducting motor apparatus 1 is used and operated, the conductive portion 33, the stator core 21, and the superconducting coil 22 are each maintained in the extremely low temperature state. Thus, in a case where the superconducting coil 22 is used, an amount of thermal shrinkage of the cooling cylinder portion 33k of the conductive portion 33 in a radial direction, i.e., an amount of thermal shrinkage $\delta 33$, is greater than an amount of thermal shrinkage of the stator core 21 in a radial direction, i.e., an amount of thermal shrinkage $\delta 21$ ($\delta 33 > \delta 21$). Accordingly, when the superconducting motor apparatus 1 is used, the cooling cylinder portion 33k of the conductive portion 33 is thermally shrunk in the radial direction, thereby engaging and tightening the stator core 21 and further making close contact with the outer peripheral portion 21p of the stator core 21. Consequently, the thermal conductivity between the cooling cylinder portion 33k of the conductive portion 33 and the outer peripheral portion 21p of the stator 21 is enhanced.

Further, according to the present embodiment, a material constituting the cooling cylinder portion 33k of the conductive portion 33 is a nonmagnetic material or a paramagnetic material such as copper, aluminum, copper alloy, and aluminum alloy and is not a ferromagnetic material such as an iron-based material. In this case, the magnetic flux penetrating through the stator core 21 is prevented from leaking outside from the outer peripheral portion 21p of the stator core 21.

When the superconducting motor apparatus 1 is driven to rotate, the motor reaction force is generated in association with the rotation of the rotor 27. At this time, it may be considered to actively receive the motor reaction force by the cooling cylinder portion 33k of the conductive portion 33. However, in such case, an increase of support strength of the cooling cylinder portion 33k is necessary, thereby requiring a structure at the first container 43, serving as the housing, to actively support the cooling cylinder portion 33k of the conductive portion 33. According to such structure, the contact area between the first container 43 positioned close to the outer atmosphere (i.e., a normal temperature) and the cooling cylinder portion 33k of the conductive portion 33 in the extremely low temperature state tends to increase. Then, the cold temperature of the cooling cylinder portion 33k is likely to leak to the first container 43, which is undesirable in view of retention of the low temperature of the cooling cylinder portion 33k, the stator core 21, and the superconducting coil 22.

In response to the aforementioned issue, according to the present embodiment, the facing portions 44r and 44p of the second container 44 (a facing member) face the first end 21e and the second end 21f of the outer peripheral portion 21p of the stator core 21 where the cooling cylinder portion 33k is prevented from thermally making contact. As a result, the facing portions 44r and 44p of the second container 44, facing the outer peripheral portion 21p of the stator core 21, oppose and receive the motor reaction force. According to the present embodiment, the motor reaction force is not received by the cooling cylinder portion 33k of the conductive portion 33 but is actively received by the facing portions 44r and 44p of the second container 44. Because the second container 44 is supported by the first and second cover portions 43r and 43s of the first container 43 serving as the housing, the facing portions 44r and 44p appropriately oppose the motor reaction force.

A contact area between the cooling cylinder portion 33k and the stator core 21, i.e., a contact area SA, is greater than a contact area between the second container 44 serving as the facing member and the stator core 21, i.e., a contact area SB (SA>SB). Thus, the stator core 21 is likely to be cooled by the cooling cylinder portion 33k of the conductive portion 33. As the case may be, the contact area SA may be smaller than the contact area SB. In such case, because the contact area SB between the second container 44 and the stator core 21 is large, it may be favorable for the second container 44 to receive the motor reaction force. As necessary, the contact area SA may be equal to the contact area SB (SA=SB) or the contact area SA is substantially equal to the contact area SB (SA≈SB).

Figure 3:
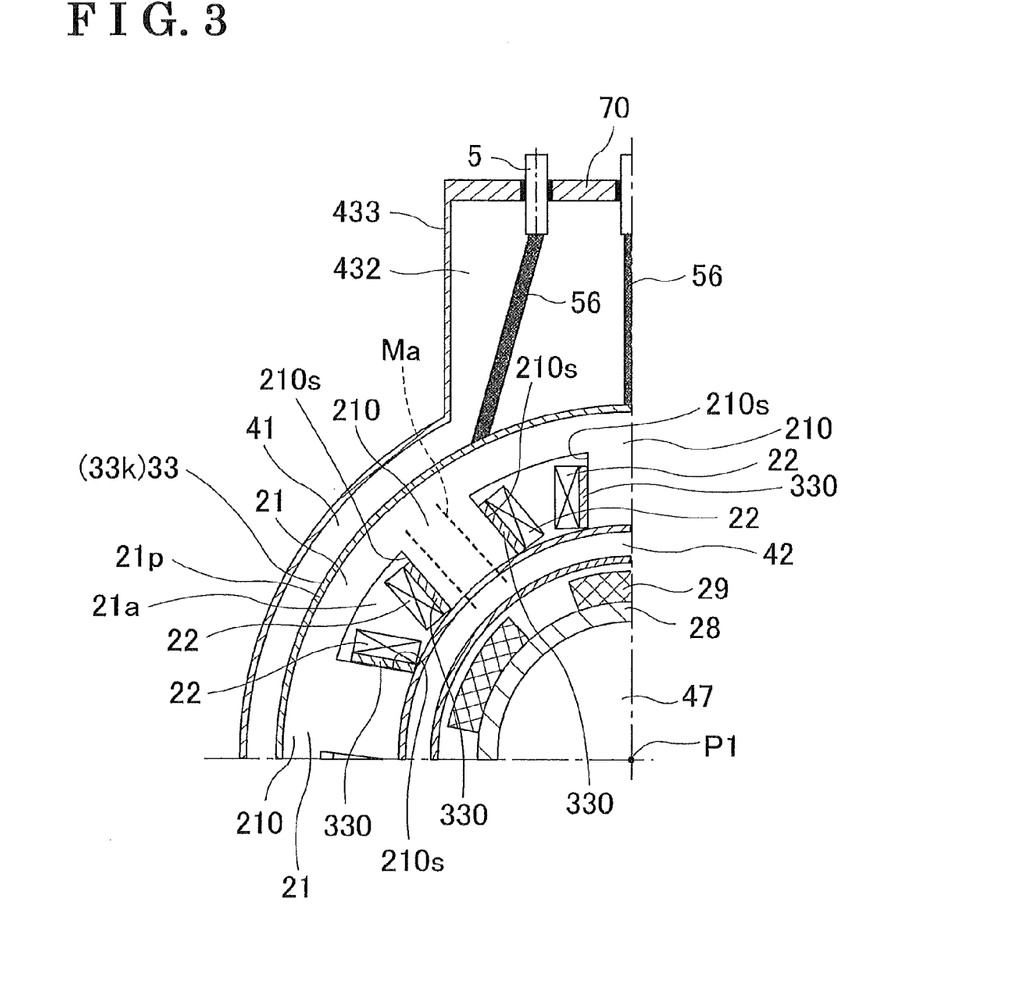
FIG. 3 is a cross-sectional view in the vicinity of teeth portions of a stator core according to a second embodiment disclosed here.

A second embodiment will be explained with reference to FIG. 3. The second embodiment basically includes same structures and effects as those of the first embodiment. Thus, FIGS. 1 and 2 are also used to explain the second embodiment. As illustrated in FIG. 3, the stator core 21 includes the multiple teeth portions 210 arranged in the circumferential direction while having equal distances so as to project in the radially inner direction of the stator core 21. In addition, conductive materials for teeth (hereinafter referred to as teeth conductive members 330) are disposed between the teeth portions 210 and the superconducting coil 22. The teeth conductive members 330 are each formed by a thermally conductive material serving as a base material and having a higher conductivity than that of the material forming the stator core 21, such as copper, aluminum, copper alloy, and aluminum alloy, so as to cool the superconducting coil 22 via the teeth portions 210.

Each of the teeth conductive members 330 faces and makes contact with a side surface 210s of each of the teeth portions 210 of the stator core 21. The teeth conductive members 330 are cooled by the teeth portions 210 of the stator core 21 so as to cool the superconducting coil 22. At each of the teeth portions 210, a magnetic flux Ma (see FIG. 3) penetrates through a radial direction of the stator core 21. Thus, the teeth conductive members 330 are arranged along the magnetic flux Ma that penetrates through the teeth portions 210, so that a penetration of the magnetic flux Ma is prevented from being interfered. As a result, the output of the superconducting motor 2 is appropriately maintained.

Figure 4:
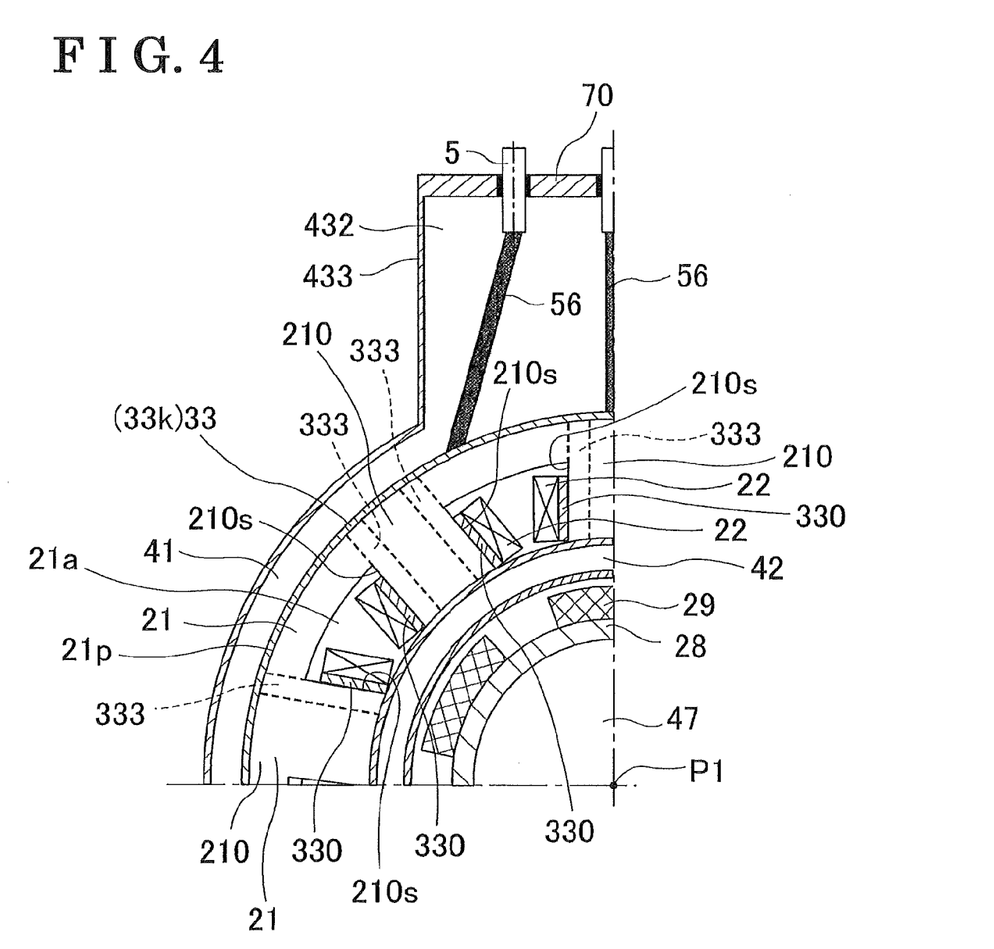
FIG. 4 is a cross-sectional view in the vicinity of the teeth portions of the stator core according to a third embodiment disclosed here.

A third embodiment will be explained with reference to FIG. 4. The third embodiment basically includes same structures and effects as those of the first and second embodiments. Thus, FIGS. 1 and 2 are also used to explain the third embodiment. As illustrated in FIG. 4, the teeth conductive members 330 are connected, via connecting portions 333, to the conductive portion 33 that surrounds the outer peripheral portion 21p of the stator core 21. The teeth conductive members 330 are thus integrally formed with the conductive portion 33. Therefore, when the conductive portion 33 is cooled to the lower temperature by the cold head 32 of the extremely low temperature generating portion 3, the teeth conductive members 330 are also immediately cooled to the low temperature, thereby easily cooling the superconducting coil 22. The output of the superconducting motor 2 is appropriately ensured. The connecting portions 333 are arranged at both the first end 21e and the second end 21f of the stator core 21.

Figure 5:
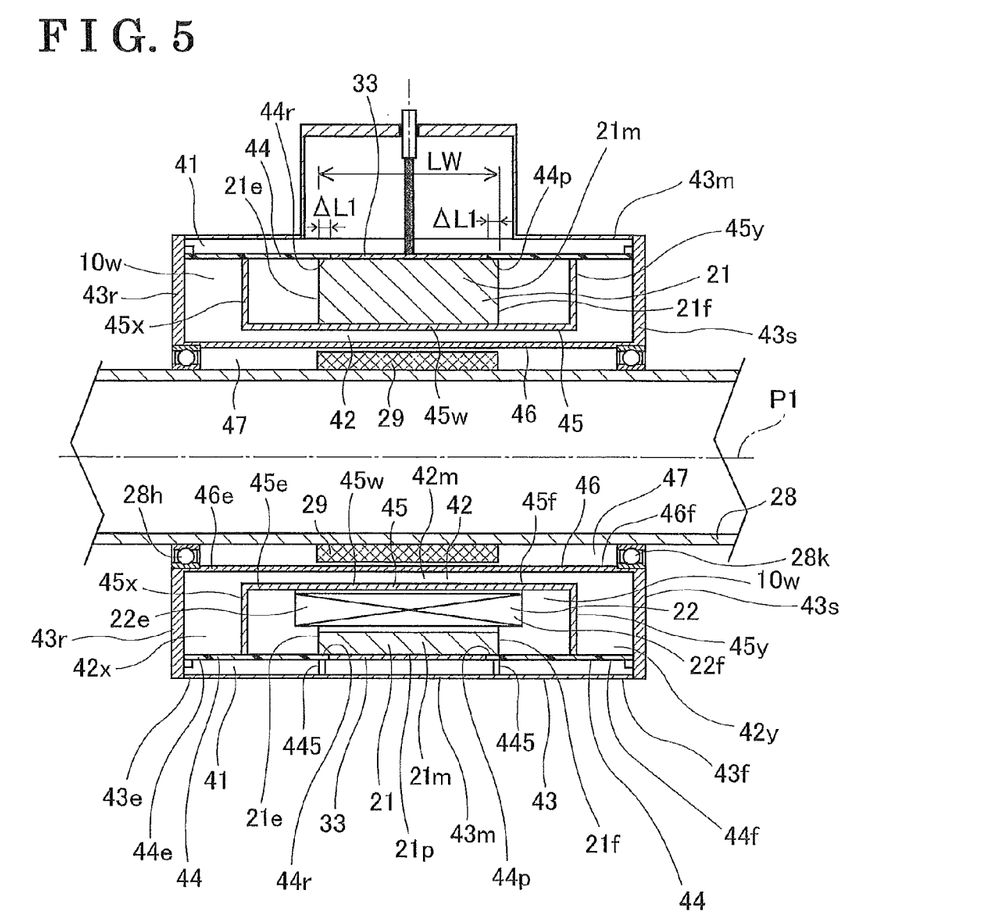
FIG. 5 is a cross-sectional view taken along the axial center of the superconducting motor apparatus according to a fourth embodiment.

A fourth embodiment will be explained with reference to FIG. 5. The fourth embodiment basically includes same structures and effects as those of the first and second embodiments. Thus, FIG. 1 is also used to explain the fourth embodiment. As illustrated in FIG. 5, the facing portions 44r and 44p of the second container 44 face the first end 21e and the second end 21f of the outer peripheral portion 21p of the stator core 21. Consequently, the second container 44 faces the outer peripheral portion 21p of the stator core 21 and opposes the motor reaction force, thereby receiving the motor reaction force. The motor reaction force is not received by the conductive portion 33 but actively received by the facing portions 44r and 44p of the second container 44. Further, a reinforcing member 445 is disposed between the second container 44 and the first container 43 so as to extend in the radial direction thereof. Thus, even at a time of generation of the large motor reaction force, the motor reaction force is further appropriately received by the facing portions 44r and 44p. The reinforcing member 445 is arranged at an outer peripheral side of the facing portions 44r and 44p, thereby supporting the facing portions 44r and 44p.

Figure 6:
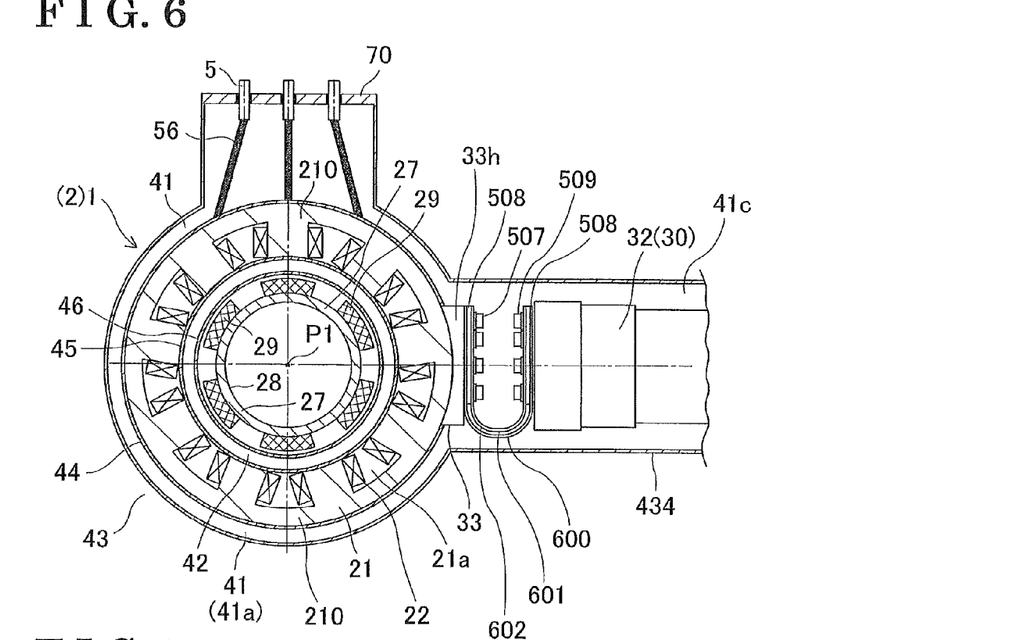
FIG. 6 is a partial cross-sectional view of the superconducting motor apparatus according to a fifth embodiment disclosed here.

A fifth embodiment will be explained with reference to FIG. 6. The fifth embodiment basically includes same structures and effects as those of the first and second embodiments. Thus, FIG. 2 is also used to explain the fifth embodiment. As illustrated in FIG. 6, an intermediate conductive mechanism 600 having a U-shape in a cross section is provided between the cold head 32 of the refrigerator 30 and the conductive portion 33. One end of the intermediate conductive mechanism 600 is fixed by means of a screw 507 to the head portion 33h of the conductive portion 33 via an intermediate member 508. The other end of the intermediate conductive mechanism 600 is fixed by means of a screw 509 to the cold head 32 via the intermediate member 508. The intermediate member 508 having a large thermal conductivity (temperature conductivity) is made of a flexible material such as indium and indium alloy so as to increase thermal contact performance. The intermediate conductive mechanism 600 includes a laminate 602 in which metallic plates 601 are laminated. The metallic plates 601 are each formed by metal having a large thermal conductivity such as copper, aluminum, copper alloy, and aluminum alloy. The cold temperature of the cold head 32 is transmitted to the head portion 33h of the conductive portion 33 via the intermediate conductive mechanism 600. Because the intermediate conductive mechanism 600 has the U-shape in the cross section, the intermediate conductive mechanism 600 is excellent not only in thermal conductivity but also in vibration absorption. Therefore, the intermediate conductive mechanism 600 is favorable and appropriate for preventing a vibration propagation between the superconducting motor 2 and the refrigerator 3.

Figure 7:
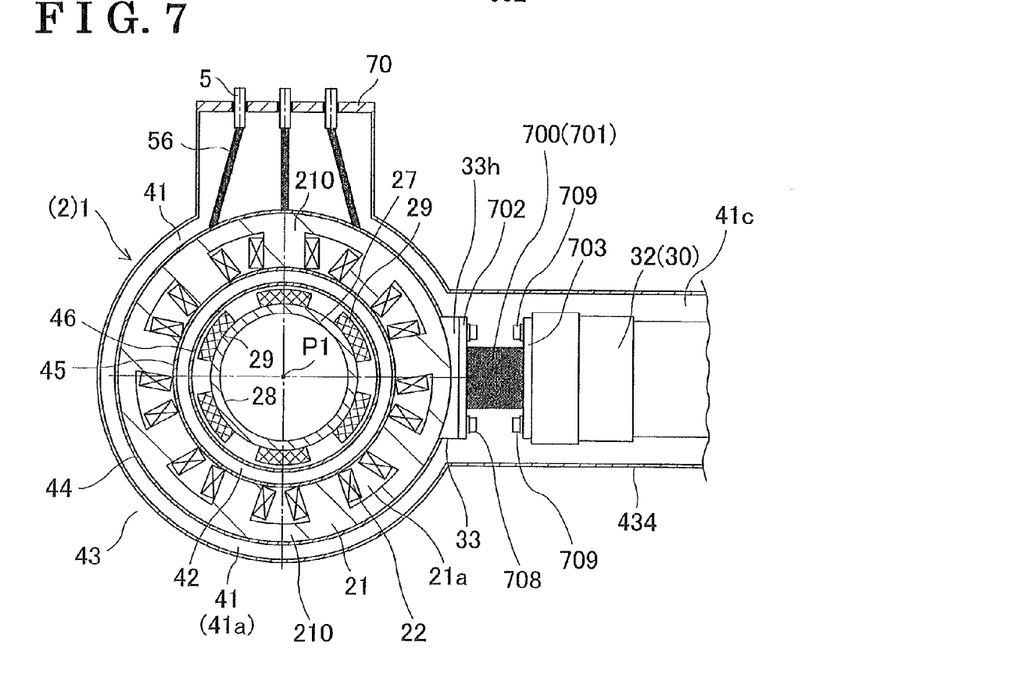
FIG. 7 is a partial cross-sectional view of the superconducting motor apparatus according to a sixth embodiment disclosed here.

A sixth embodiment will be explained with reference to FIG. 7. The sixth embodiment basically includes same structures and effects as those of the first and second embodiments. Thus, FIG. 2 is also used to explain the sixth embodiment. As illustrated in FIG. 7, an intermediate conductive mechanism 700 is provided between the cold head 32 of the refrigerator 30 and the conductive portion 33. The intermediate conductive mechanism 700 is formed by multiple metal mesh wires. The intermediate conductive mechanism 700 includes a main body 701 formed by the multiple metal mesh wires, and flanges 702 and 703 connected to the main body 701 by means of welding, brazing, soldering, riveting, screwing, or the like. The flange 702 is fixed to the head portion 33h of the conductive portion 33 by means of a screw 708. The flange 703 is fixed to the cold head 32 by means of a screw 709. The main body 701 is formed by a mesh of metal having a large thermal conductivity, such as copper, aluminum, copper alloy and aluminum alloy. The flanges 702 and 703 may be fixed to the conductive portion 33 and the cold head 32, respectively, by means of welding, brazing or soldering. Because the main body 701 is formed by the multiple metal mesh wires, the main body 701 is excellent not only in thermal conductivity but also in vibration absorption, which is favorable to restrain the vibration propagation between the superconducting motor 2 and the refrigerator 30.

According to the aforementioned embodiments, the rotor 27 includes the rotational shaft 28 rotatably supported around the axial center P1 and the multiple permanent magnet portions 29 arranged at the outer peripheral portion of the rotational shaft 28 having intervals in the peripheral direction. Alternatively, the permanent magnet portions 29 may be provided at the stator 20 and the superconducting coil 22 may be provided at the rotor 27. The aforementioned embodiments apply to the superconducting motor apparatus 1 mounted on a vehicle. Alternatively, the embodiments may apply to the superconducting motor apparatus 1 in a stationary state. In addition, according to the aforementioned embodiments, the rotor 27 serves as the mover because the superconducting motor apparatus 1 is a rotatably operating type. Alternatively, the superconducting motor apparatus 1 may be a directly operating linear motor for directly operating the mover. In this case, the stator 20 is formed, extending in one direction to generate a movable magnetic field to thereby directly operate the mover.

According to the aforementioned embodiments, the rotor 27 includes the permanent magnet portions 29 while the stator 20 includes the stator core 21 and the superconducting coil 22 wound on the stator core 21 and held thereby. Alternatively, the stator may include the permanent magnet portions and the rotor may include the superconducting coil. In addition, according to the embodiments, the stator core 21 is formed into a cylindrical shape. Alternatively, the stator core 21 may include divided portions in the circumferential direction that are assembled to form a cylinder body.

A specific structure or function for one of the embodiments may be applicable to the other of the embodiments. For example, structures according to the embodiments 2 to 7 may be applicable to the first embodiment. The embodiments are not limited to have the aforementioned structures and may be appropriately modified or changed.

According to the aforementioned embodiments, the following technical idea may also be obtained. The superconducting apparatus 1 includes the superconducting coil 22 generating a magnetic field when an electric power is supplied to the superconducting coil 22, the stator core 21 having the teeth portions 210 and into which a magnetic flux of the magnetic field generated by the superconducting coil 22 permeates, and the teeth conductive members 330 arranged between the teeth portions 210 and the superconducting coil 22 respectively. Each of the teeth conductive members 330 includes a thermal conductive (temperature conductive) material that serves as a base material and that has a larger thermal conductivity (temperature conductivity) than a thermal conductivity of a material constituting the stator core 21 so as to cool the superconducting coil 22 via the teeth portions 210 of the stator core 21.

The aforementioned embodiments may be applicable to the superconducting apparatus such as the superconducting motor apparatus used in a vehicle, for an industrial purpose, for a medical use, and the like.

According to the aforementioned embodiments, the stator core 21 is positioned adjacent to the superconducting coil 22 so that the magnetic flux of the magnetic field generated by the superconducting coil 22 is permeated through the stator core 21. The conductive portion 33 is cooled to the extremely low temperature state by means of the extremely low temperature generating portion 3. The conductive portion 33 that is cooled to the extremely low temperature state thermally makes contact with the stator core 21 to thereby cool the stator core 21. When the stator core 21 is cooled in the aforementioned manner, the temperature of the superconducting coil 22 arranged so as to thermally make contact with the stator core 21 is appropriately maintained in the low temperature state. Then, the superconducting state of the superconducting coil 22 is appropriately maintained. Thus, even when a heat intrusion occurs at the superconducting coil 22, an output load of the superconducting motor apparatus 1 increases, a disturbance occurs, or the like, the stator core 21 maintains the superconducting coil 22 in the low temperature state. The temperature increase of the superconducting coil 22 is restrained, thereby appropriately retaining the superconducting state of the superconducting coil 22.

The superconducting coil 22 generates a magnetic field when an electric power is supplied to the superconducting coil 22. A shape, a structure, and the like of the superconducting coil 22 are not specifically defined. Further, the extremely low temperature generating portion 3 maintains the superconducting coil 22 at a low temperature, i.e., at a temperature equal to or smaller than a critical temperature of the superconducting coil 22 so that the superconducting coil 22 is kept in the superconducting state. The low temperature desirably corresponds to an extremely low temperature. The extremely low temperature is equal to or smaller than a temperature range at which the superconducting state of the superconducting coil 22 is maintained. Accordingly, the temperature range of the extremely low temperature state differs depending on a critical temperature or a composition of a superconducting material constituting the superconducting coil 22. In practice, the extremely low temperature is desirably equal to or smaller than a liquefaction temperature of nitrogen gas (i.e., 77K). At this time, however, the extremely low temperature may be equal to or smaller than 100K or 150K depending on a composition of the superconducting coil 22. The extremely low temperature generating portion 3 may be a structure including a refrigerator, a conductive mechanism transmitting a low temperature from the refrigerator to the superconducting coil, or a mechanism for heat-insulating and holding a refrigerator at the extremely low temperature such as liquefied helium, liquefied nitrogen, and liquefied oxygen without an installation of the refrigerator.

The stator core 21 (permeable yoke) is made of a magnetically permeable material in which the magnetic flux easily permeates so that the magnetic flux of the magnetic field generated by the superconducting coil 22 permeates. Pure iron, silicon steel, ferrite-rich cast iron, ferrite-rich cast steel, or the like is used for the magnetically permeable material.

According to the aforementioned embodiments, the stator core 21 is formed into a cylindrical shape around an axial center thereof and the conductive portion 33 thermally makes contact with the outer peripheral portion 21p of the stator core 21.

In this case, because a radius of the outer peripheral portion 21p of the stator core 21 is larger than that of an inner peripheral portion of the stator core 21, a thermally contact area between the conductive portion 33 and the stator core 21 is ensured.

In addition, according to the aforementioned embodiments, a material constituting the conductive portion 33 has a larger linear expansion coefficient than a linear expansion coefficient of a material constituting the stator core 21.

When the superconducting motor apparatus 1 is used after being assembled, the amount of thermal shrinkage of the conductive portion 33 is ensured and therefore the conductive portion 33 engages and tightens the stator core 21. The linear expansion coefficient corresponds to a thermal shrinkage ratio.

Further, according to the aforementioned embodiments, the stator core 21 includes the plurality of teeth portions 210 arranged in the circumferential direction of the stator core 21 while having equal distances, and the teeth conductive members 330 are arranged between the teeth portions 210 and the superconducting member 22 respectively, each of the teeth conductive members 330 including a thermal conductive material that serves as a base material and that has a larger thermal conductivity than a thermal conductivity of a material constituting the stator core 21, the teeth conductive members 330 cooling the superconducting coil 22 via the teeth portions 210 of the stator core 21.

The superconducting coil 22 is appropriately cooled by the teeth conductive members 330 accordingly.

Furthermore, according to the aforementioned embodiments, the conductive portion 33 and each of the teeth conductive members 330 are connected to each other.

In this case, when the conductive portion 33 is cooled by the extremely low temperature generating portion 3, the teeth conductive members 330 are then cooled, thereby cooling the teeth portions 210 of the stator core 21 and further the superconducting coil 22.

Furthermore, according to the aforementioned embodiments, the superconducting apparatus constitutes the superconducting motor apparatus 1, and the second container (facing member) 44 is provided to face a portion of the stator core 21 where the conductive portion 33 is prevented from thermally making contact, the second container (facing member) 44 opposing a motor reaction force.

When the superconducting motor apparatus 1 is operated, the second container (facing member) 44 opposes and faces the motor reaction force.

Furthermore, according to the aforementioned embodiments, the low temperature portion includes the cold head 32 of the refrigerator 30 generating the extremely low temperature.

Furthermore, according to the aforementioned embodiments, the refrigerator 30 is selected from a pulse tube refrigerator, a Stirling refrigerator, a Gifford-McMahon refrigerator, a Solvay refrigerator, and a Vuilleumier refrigerator.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A superconducting apparatus comprising:
a superconducting member generating a magnetic field when an electric power is supplied to the superconducting member;
a permeable yoke into which a magnetic flux of the magnetic field generated by the superconducting member permeates and which is formed into a cylindrical shape around an axial center of the permeable yoke; and
a conductive portion possessing a cooling cylinder portion covering an outer peripheral portion of the permeable yoke so as to be coaxial with the outer peripheral portion, a material forming the conductive portion having a larger linear expansion coefficient than a linear expansion coefficient of material forming the permeable yoke,
the conductive portion being cooled to a low temperature state by a low temperature portion and cooling the permeable yoke by thermal contact of the cooling cylinder portion with the permeable yoke.

2. The superconducting apparatus according to claim 1, wherein the permeable yoke includes a plurality of teeth portions arranged in a circumferential direction of the permeable yoke while having equal distances, and teeth conductive members are arranged between the teeth portions and the superconducting member respectively, each of the teeth conductive members including a thermally conductive material that serves as a base material and that has a larger thermal conductivity than a thermal conductivity of a material constituting the permeable yoke, the teeth conductive members cooling the superconducting member via the teeth portions of the permeable yoke.

3. The superconducting apparatus according to claim 2, wherein the conductive portion and each of the teeth conductive members are connected to each other.

4. The superconducting apparatus according to claim 1, wherein the superconducting apparatus constitutes a superconducting motor apparatus, and a facing member is provided to face a portion of the permeable yoke where the conductive portion is prevented from thermally making contact, the facing member opposing a motor reaction force.

5. The superconducting apparatus according to claim 1, wherein the low temperature portion includes a cold head of a refrigerator generating an extremely low temperature.

6. The superconducting apparatus according to claim 5, wherein the refrigerator is selected from a pulse tube refrigerator, a Stirling refrigerator, a Gifford-McMahon refrigerator, a Solvay refrigerator, and a Vuilleumier refrigerator.

7. A superconducting electric motor comprising:
a shaft possessing a rotational axis;
a superconducting, member generating a magnetic field when supplied with electric power;
a cylindrical permeable yoke surrounding the shaft and possessing an outer circumferential surface and a central axis common with the rotational axis of the shaft, wherein a magnetic flux of the magnetic field generated by the superconducting member permeates the cylindrical permeable yoke;

a conductive portion possessing a cylindrical cooling portion surrounding the cylindrical permeable yoke, the cylindrical cooling portion possessing a central axis common with the rotational axis of the shaft and possessing an inner circumferential surface covering and thermally contacting the outer circumferential surface of the cylindrical permeable yoke;

the conductive portion being cooled to a low temperature by a low temperature portion and cooling the cylindrical permeable yoke by the thermal contact between the inner circumferential surface of the cylindrical cooling portion and the outer circumferential surface of the cylindrical permeable yoke; and the cylindrical cooling portion being formed of a material having a larger linear expansion coefficient than a linear expansion coefficient of a material forming the cylindrical permeable yoke so that the cylindrical cooling portion tightens against the cylindrical permeable yoke when the temperature of the cylindrical cooling portion is lowered.

8. The superconducting electric motor of claim 7, wherein the low temperature portion comprises a cold head of a refrigerator.

9. The superconducting electric motor of claim 8, wherein the refrigerator is at least one of a pulse tube refrigerator, a Stirling refrigerator, a Gifford-McMahon refrigerator, a Solvay refrigerator, and a Vuilleumier refrigerator.

* * * * *